May 31, 1932.  A. M. TROGNER  1,860,440
ROTARY VARIABLE CONDENSER
Filed Feb. 25, 1929  3 Sheets-Sheet 2
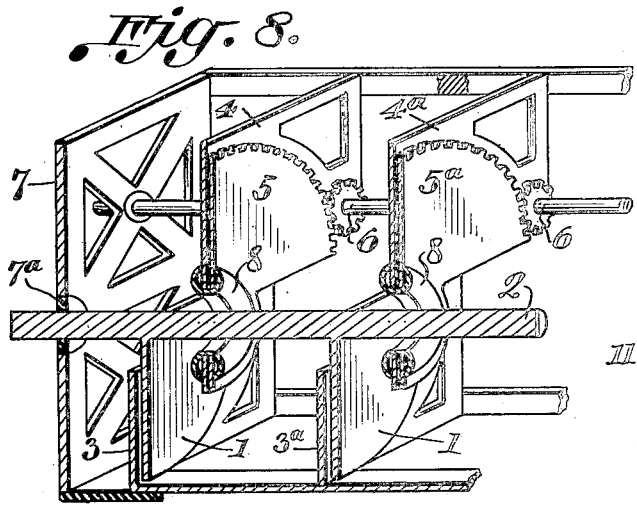
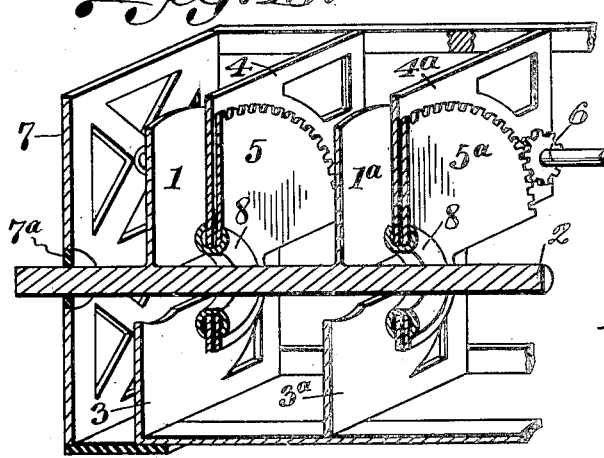
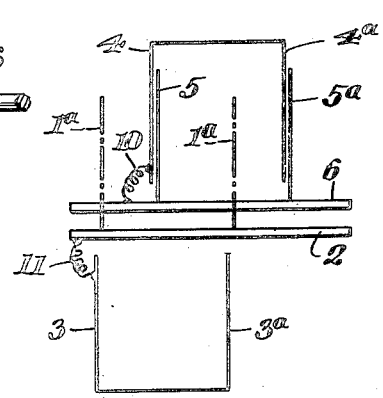
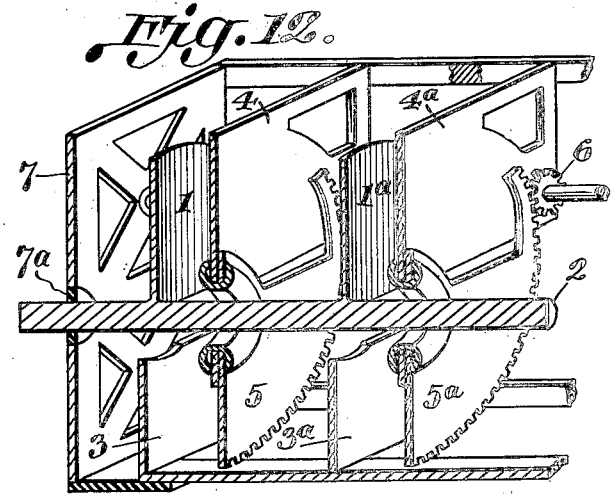
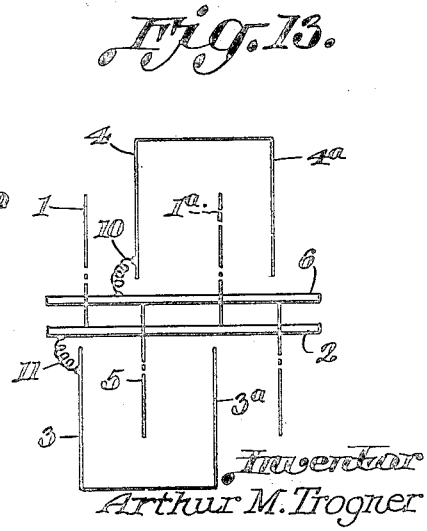
Inventor
Arthur M. Trogner

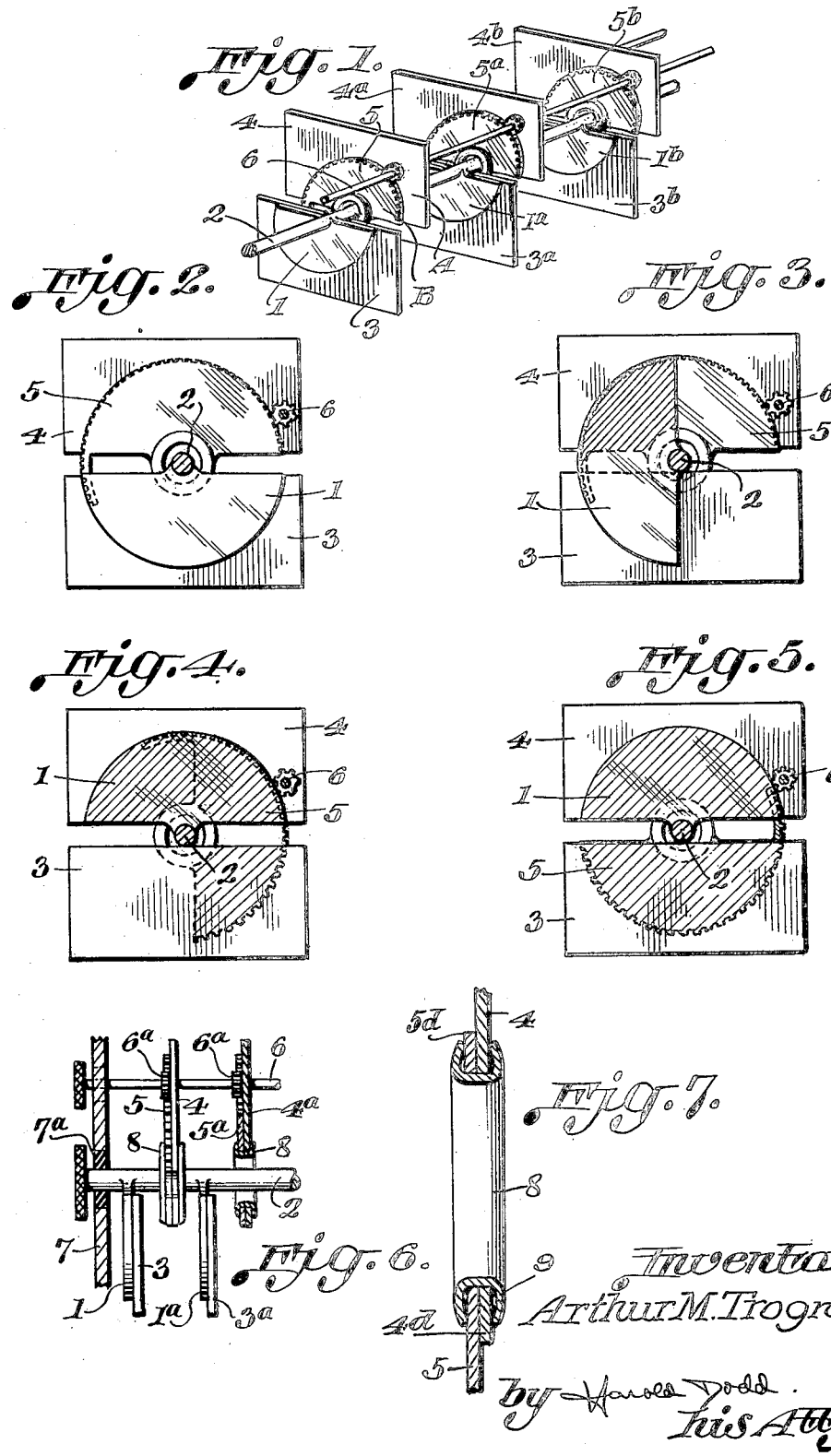

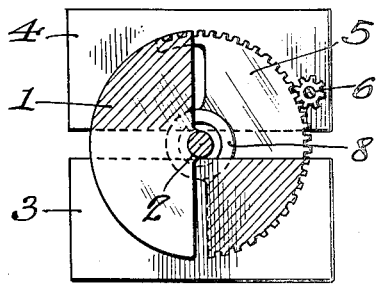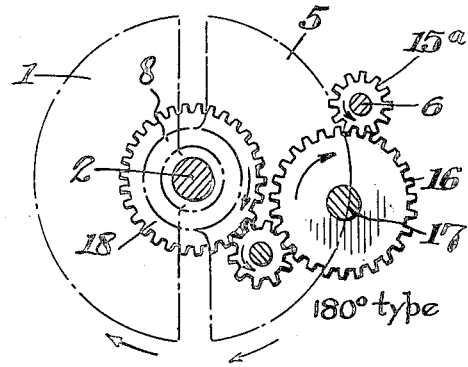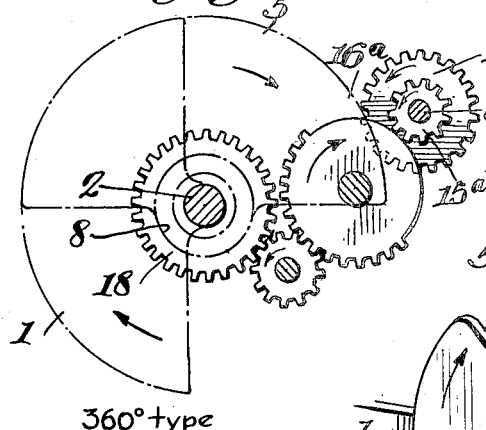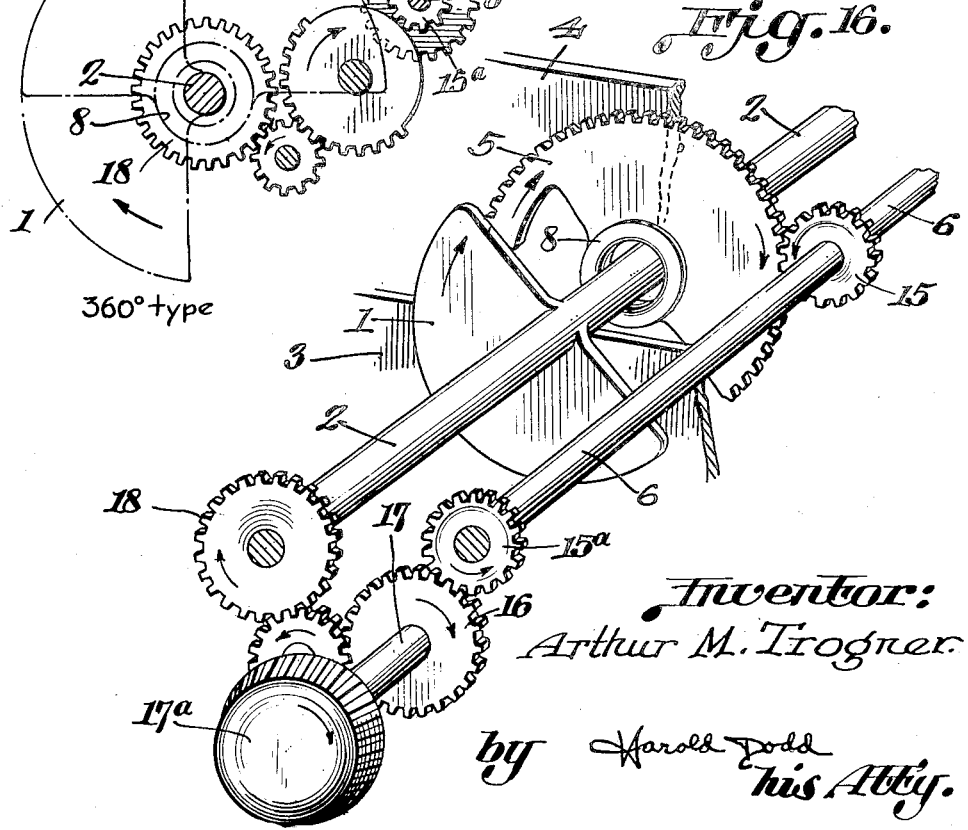

Patented May 31, 1932

1,860,440

UNITED STATES PATENT OFFICE

ARTHUR H. TROGNER, OF EAST ORANGE, NEW JERSEY, ASSIGNOR, BY MESNE ASSIGNMENTS, TO WIRED RADIO, INC., OF NEW YORK, N. Y., A CORPORATION OF DELAWARE

ROTARY VARIABLE CONDENSER

Application filed February 25, 1929. Serial No. 342,571.

My invention relates to rotary variable condensers in general and more particularly to rotary variable condensers employed in signaling systems.

An object of my invention is to provide a rotary variable condenser which occupies less space per unit of capacity than the space occupied by a condenser of like capacity of the type employed heretofore.

Another object of my invention is to provide an increase in the capacity of a rotary variable condenser by employing to advantage the space which serves no useful purpose in an ordinary type of condenser.

Other and further objects reside in the structural features of the rotary variable condenser of my invention, a better understanding of which can be had from the specification following and by referring to the accompanying drawings wherein:

Figures 1, 2, 3, 4 and 5 show certain embodiments of the rotary variable condenser of my invention; Figs. 6 and 7 depict certain structural features of my invention; Figs. 8, 10 and 12 show further structural features and different operational adjustments; Figs. 9, 11 and 13 show schematically the adjustments shown in Figs. 8, 10 and 12; Figs. 14, 15 and 16 are illustrations showing modifications and the operation of the rotary variable condenser of my invention; and Fig. 17 shows another modification of the rotary variable condenser of my invention.

In variable condensers of the rotary plate type the capacity of the condenser depends upon the area of the adjacent stator and rotor plates and the spacial separation thereof. The capacity is reduced by moving one set of plates in respect to a set of stationary plates causing the effective area or adjacent area of the plates to decrease. The effective capacity depends upon the area of the movable plates immediately adjacent to the stationary plates. Minimum capacity is obtained by causing the movable plates to emerge from the adjacent stationary plates and usually requires the rotation of 180° or one half circle. Maximum capacity is had by rotating the movable plates 180° from the position last mentioned which causes the adjacent area of stator and rotor plates to be at a maximum. The space occupied by the rotor plates when totally emerged from the stator plates at minimum capacity value must be reserved and no increase in the capacity of the condenser is had. It is one advantage of the rotary variable condenser of my invention that this space is utilized to increase the capacity value of the condenser. A better understanding can be had by referring to the accompanying drawings.

Fig. 1 of the accompanying drawings shows schematically the mechanical features of the rotary variable condenser of my invention. Corresponding reference characters are employed throughout the illustrations. Supports for the stator and rotor plates are omitted from Fig. 1 for clearness of illustration. The movable rotor plates 1, 1a and 1b are positioned on a common shaft 2. Immediately adjacent and electrically connected to movable rotor plates 1, 1a and 1b are stationary or auxiliary plates 3, 3a and 3b, respectively. Stationary plates 4, 4a and 4b are positioned adjacent to plates 3, 3a and 3b and disposed in parallel planes in respect to the planes of plates 3, 3a and 3b and disposed in a horizontal plane other than the plane of plates 3, 3a and 3b and other than the horizontal plane of plates 1, 1a and 1b. Immediately adjacent to stationary plates 4, 4a and 4b are provided auxiliary plates 5, 5a and 5b. Plates 5, 5a and 5b bear against stationary plates 4, 4a and 4b respectively, constituting an electrical connection. A suitable half gear is provided around the semi-circular periphery of auxiliary plates 5, 5a and 5b, by means of which gear and shaft mechanism 6 controls the movement of these plates.

Fig. 2 shows stationary plate 4 and auxiliary plate 5, rotary plate 1 and auxiliary plate 3. Shaft 2 supports and is electrically connected to rotary plate 1. Rotary plate 1 is adjacent to auxiliary plate 3. Auxiliary plate 5 is adjacent to and bears against stationary plate 4. Gear mechanism 6 controls the rotary movement of auxiliary plate 5. The capacity of the condenser is at minimum with the plates positioned in the manner shown in Fig. 2.

Fig. 3 shows the same plate members with rotary plate 1 in the position partly emerging adjacent to plates 4 and 5. The capacity in this position is approximately one fourth the total capacity of the condenser. Reference characters correspond in all the drawings. Fig. 4 shows the same plate members with the complete area of rotary plate 1 adjacent to plate 4 and one half the area of auxiliary plate 5 adjacent to plate 3. The capacity with the plates in this position is approximately three fourths the total capacity of the condenser. Should auxiliary plate 5 be in the position shown in Fig. 3 and rotary plate 1 in the position now shown the capacity would be approximately one half the total capacity of the condenser. Fig. 5 shows still another position of auxiliary plate 5 wherein the entire area is adjacent to auxiliary plate 3. This position is that of maximum capacity. In Figs. 2, 3, 4 and 5 the effective capacity of the respective adjustments is indicated by the shaded portions of the condenser plates. As heretofore mentioned, plates 1 and 3 are electrically interconnected and plates 4 and 5 are electrically interconnected. The position of the plates in Fig. 5 shows the total area of plate 5 adjacent to plate 3 but electrically insulated therefrom. The total area of plate 1 is adjacent to plate 4 but electrically insulated therefrom. A potential difference on plates 1 and 4 and on plates 3 and 5 would be present were the condenser connected in an electrical circuit with a source of energy in the usual manner.

Figs. 6 and 7 illustrate certain structural features of the rotary variable condenser of my invention and more particularly the adjusting mechanism and supporting arrangement for the plate members. Fig. 6 shows an insulating member 7a and supporting member 7 through which shafts 2 and 6 are extended. Shaft 6 is provided with suitable gears 6a which latter are associated with half gears on auxiliary plates 5 and 5a. Shaft 2 is supported by members 7 and 7a and carries rotary plates 1 and 1a. Rotary plates 1 and 1a are adjacent to auxiliary plates 3 and 3a, respectively. Plates 5 and 5a are electrically connected to and are adjacent to plates 4 and 4a, respectively. Auxiliary plates 5 and 5a are supported by means of grommets or bearing supports 8. Grommets 8 are in reality clamping members which support plates 5 and 5a and allow these plates to move in respect to plates 4 and 4a to which they are connected. The grommet or bearing support is shown in greater detail in Fig. 7. Auxiliary plate 4 is clamped by clamping member 9 to plate 5. Plates 4 and 5 have circular shaped portions referred to as the inner radius area in condenser design. The clamping member or grommet may comprise a tubular rivet which is suitably flanged thereby clamping the plates 4 and 5. The inner radius of the annular member of grommet 8 is sufficiently large to allow the shaft 2, which supports plates 1 and 1a, to turn freely and without making an electrical connection with grommet 8 and hence with plates 4 and 5. Plate 5 bears against plate 4 and is movable with respect thereto. The position shown in this cross-section of grommet 8 is where the effective area of plate 5 is not immediately adjacent to plate 4, but is in the position as shown in Fig. 5 of the accompanying drawings. The circular portions or inner radius of the plates referred to above, are indicated by the reference characters 4d and 5d.

Figs. 8, 10 and 12 are partially cross-sectional views showing certain structural features of the rotary variable condenser of my invention and more particularly showing the relative positionings of the plates 1, 3, 4, 5, 1a, 3a, 4a, and 5a for different values of capacity. In Fig. 8 the position of the plates is shown whereby minimum capacity is obtained. A schematic circuit diagram representing the relative positioning of the plates for minimum capacity is shown in Fig. 9. The electrical connection between plates 4 and 5 is shown by connector 10 and that between plates 1 and 3 by connector 11. The plates and supporting members shown in Figs. 8, 10 and 12 are not drawn to scale and the spacing between the plates is increased for better illustrating the operation. Fig. 10 shows rotary plates 1 and 1a moved to a position more nearly adjacent to plates 4 and 4a. This position of the plates is that occupied when the capacity of the condenser is approximately one half the total capacity value of the condenser. Fig. 11 shows schematically the relative position of the plates. In Fig. 12, rotary plates 1 and 1a are shown occupying the same position as shown in Fig. 10 but here the auxiliary plates 5 and 5a are moved more nearly adjacent to plates 3 and 3a. This position is that employed for maximum capacity adjustment.

Fig. 13 shows the relative positioning of the plates. Should a source of electrical energy be connected to plates 4 and 4a, maximum potential difference would be present between plates 1 and 4, 4 and 1a, 1a and 4a, 3 and 5, 5 and 3a and between 3a and 5a.

Figs. 14, 15 and 16 show a modification of the adjustable rotary condenser of my invention. Fig. 14 shows schematically the electrical features of this modification wherein the shaded portions of plates 1 and 5 indicate the relative capacity value obtained in the adjustment shown. This capacity value is obtained as indicated by adjusting plates 1 and 5 simultaneously 90° from the position of minimum capacity. In the usual type of condenser the capacity obtained from adjusting the movable plate to a position 90° from that of minimum capacity would result in an effective capacity area only to the extent indicated by the shaded portion of plate 5. In the condenser of my invention the shaded area of plate 1 indicates the additional capacity available through adjustment to like extent. In the types of condensers heretofore employed the adjustment of the movable plate 90° from the position of minimum capacity usually effects one half the total capacity of the condenser. In the condenser of my invention as shown in Fig. 14, the capacity value is likewise one half that of the total available capacity. The capacity value at this adjustment of 90° is, however, in the condenser of my invention, equivalent to two times that value of other types of condensers occupying substantially equivalent space. The same applies to the maximum capacity obtainable. In Fig. 14, plates 1 and 5 when moved to a position 180° from the position of minimum capacity, the relative capacity is double that of the ordinary type of condenser.

Fig. 15 shows a mechanical arrangement for simultaneously effecting the movement of plates 1 and 5. Rotation of plate 1 through an arc of 180° is accompanied by the movement of plate 5 through like distance. Plates 1 and 5 therefore change places with respect to the effective capacity. The stationary plates and more than the two rotary plates are not shown for sake of clearness. Plate 5 is supported by grommet 8. Plate 1 is supported by shaft 2. Shaft 2 and grommet 8 are insulated with respect to each other. Spur gears 15a, 16 and 18 form the driving mechanism. Gear 15a is mounted on shaft 6 which is mechanically associated with gear teeth provided in the periphery of semi-circular plate member 5. Gear 15a engages with gear 16 and the latter engages with gear 18. Gear 18 is positioned to shaft 2. Gear 16 is positioned to shaft 17. Shaft 17 is the control shaft which when rotated causes the movement of plates 1 and 5. In this arrangement, the rotation of shaft 17 through on arc of 180°, effects the complete variation of capacity from minimum to maximum.

Fig. 16 shows the mechanical features in greater detail. The gear teeth along the periphery of plate 5 are engaged with gear 15 mounted on shaft 6. Mounted also on shaft 6, I provide a gear 15a which engages with gear 16. Gear 16 is positioned to shaft 17 which is adjustably controlled by knob or dial 17a. Gear 16 engages with gear 18 and the latter is positioned to shaft 2 which carries movable plate 1. Stationary plates 3 and 4 are shown in part section. Arrows indicate the relative movement of the several gears and mechanism when dial 17a is turned in a clockwise direction.

Fig. 17 shows a still further modification of the rotary adjustable condenser of my invention. Reference characters correspond to those of Fig. 15. In this modification, plates 1 and 5 are arranged to be adjusted in successive order. The movement of one plate through an arc of 180° is followed by the movement of the other through like distance. This necessitates the movemnt of shaft 17 through an arc of 360° or one complete revolution to effect a complete change from maximum capacity value. The mechanical features are similar to the arrangement shown in Figs. 15 and 16 with the exception of gear 16a. Gear 16a corresponds to gear 16 of Figs. 15 and 16. Gear 16a has gear teeth only on one half of its periphery, the remaining half circle not engaging with gears 15a or 18. The relation of gears 15a, 16a and 18 is such as to cause the engagement of gears 16a and 18 immediately subsequent to the disengagement of gears 16a 15a. The rotation of control shaft 17 in a clockwise direction effects movement of the several members as indicated by the adjacent arrows. Calibration of the entire dial is therefore possible instead of calibration covering only one half the dial as is the case with existing types.

In Figs. 15, 16 and 17, a small idler gear is shown engaging with gear 18 and the driving gear. The purpose of such gear is to effect movement of plate members 1 and 5 in the same directions as indicated by the arrows. The idling gear may not be employed where it is desired that one set of plates move clockwise while the other set moves counter-clockwise. The mechanical control means shown in Figs. 16 and 17 may be employed to accomplish the relative adjustments of capacity shown in Figs. 2, 3, 4 and 5 of the accompanying drawings.

Many modifications of the rotary variable condenser of my invention are possible without departing from the spirit of my invention. Plates 1 and 1a may be rotated in unison with the rotation of plates 5 and 5a or suitable gear trains with half gears may be employed whereby the rotation of the main control shaft rotates the plates 1 and 1a 180° before plates 5 and 5a being to move. Plates 1 and 1a then remain in the full capacity position while plates 5 and 5a are being brought into capacity relations with plates 3 and 3a. The latter modification makes in effect a 360° condenser. Any number of plates may be employed of suitable dimensions and specially positioned to meet the particular requirements of the specific application. It is obvious that many modifications are possible without departing from the spirit of my invention and it is to be understood that the embodiments of my invention shall in no way be limited to the description set forth in the foregoing specification or illustrated in the accompanying drawings, but only as defined in the appended claims.

What I claim as new and desire to secure by Letters Patent of the United States is as follows:

1. A rotary variable condenser comprising in combination two sets of stationary plates, one set of said plates positioned echelon in respect to the other, two sets of movable plates arranged to be rotated about a common axis, said sets of movable plates disposed in offset parallel planes each in respect to the other, said sets of movable plates electrically connected to said sets of stationary plates respectively and each set of said stationary plates electrically insulated from the other.

2. A rotary variable condenser comprising in combination two sets of stator plates, one set of said plates forming an echelon formation in respect to the other, two sets of rotor plates, each of said sets of rotor plates adapted to be individually moved in varying positions between said stator plates, an electrical connection between one set of said rotor plates and one set of said stator plates, an electrical connection between the other set of stator plates and second set of rotor plates, said sets of stator plates electrically insulated each from the other, and said sets of rotor plates electrically insulated each from the other.

3. A rotary variable condenser comprising in combination a set of parallel stationary plates, a second set of parallel stationary plates, said sets of stationary plates comprising an echelon formation each set in respect to the other, a set of rotary plates adjacent to said first mentioned set of plates, a set of rotary plates adjacent to said second mentioned set of stationary plates, said rotary plates having concentric axes of rotation, said sets of rotary plates comprising an echelon formation in respect to said stationary plates, means for independently rotating either of said sets of rotary plates, one of said sets of rotary plates comprising a plurality of semicircular plates each connected to and supported by one set of said stationary plates.

4. A rotary variable condenser comprising in combination two independent sets of stator plates, two independent sets of rotor plates, one set of stator plates positioned in echelon formation in respect to the other set of stator plates, one set of rotor plates positioned echelon in respect to the other set of rotor plates, one of said sets of stator plates supporting and electrically connected to one set of said rotor plates, the second set of said stator plates electrically connected to said other mentioned rotor plates and means for independently adjusting the capacitive relation of said stationary and rotor plates.

5. A rotary variable condenser comprising in combination two independent sets of stator plates, two independent sets of rotor plates, one set of stator plates positioned in echelon formation in respect to the other set of stator plates, one set of rotor plates positioned echelon in respect to the other set of rotor plates, one of said sets of stator plates supporting and electrically connected to one set of said rotor plates, the second set of said stator plates electrically connected to said other mentioned rotor plates and individual rotatable shafts for rotating said sets of rotor plates.

6. A rotary variable condenser comprising two sets of stationary plates, two sets of movable plates arranged to be independently rotated about a common axis, said sets of stationary plates being disposed on opposite sides of said axis, and means for rotatably supporting one of said sets of movable plates by one of said sets of stationary plates.

ARTHUR M. TROGNER.